Nov. 27, 1923.  1,475,907
A. VOLMAN
SECURING ELEMENT
Filed April 8, 1922
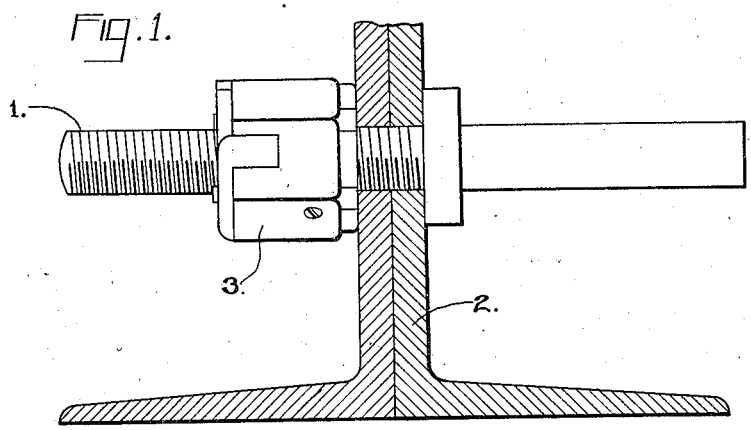
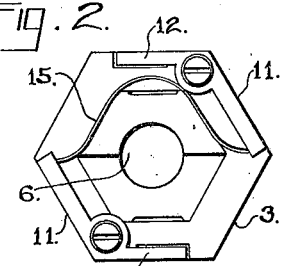
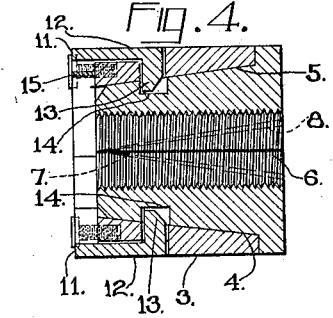
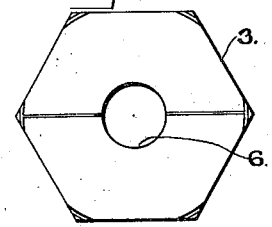
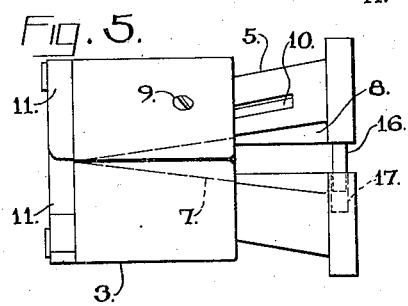
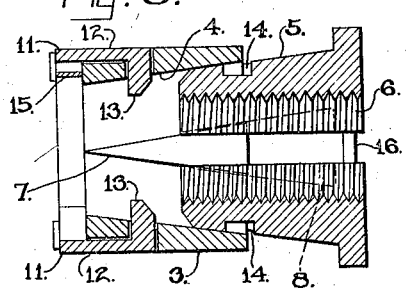
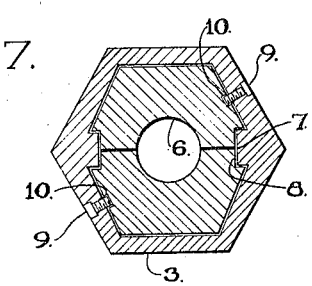
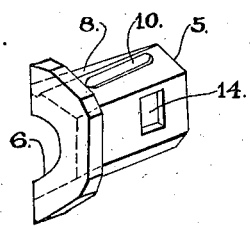
A. Volman.
INVENTOR
BY Victor J. Evans
ATTORNEY
WITNESS:
H. A. LaClair
L. B. Middleton Patented Nov. 27, 1923.

1,475,907

UNITED STATES PATENT OFFICE.

ANI VOLMAN, OF BRIDGETON, NEW JERSEY.

SECURING ELEMENT.

Application filed April 8, 1922. Serial No. 550,879.

*To all whom it may concern:*

Be it known that I, ANI VOLMAN, a citizen of the United States, residing at Bridgeton, in the county of Cumberland and State of New Jersey, have invented new and useful Improvements in Securing Elements, of which the following is a specification.

This invention relates to a nut, the general object of the invention being to provide means whereby the nut can be moved, without rotating it, upon its bolt to a point adjacent the work-piece, and then brought into engagement with the threads of the bolt so that it can be tightened as an ordinary nut.

Another object of the invention is to provide locking means for holding the threaded parts of the nut in engagement with the bolt.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the invention in use.

Figure 2 is an end view of the nut.

Figure 3 is a view of the opposite end of the nut.

Figure 4 is a longitudinal sectional view through the nut.

Figure 5 is a side view with the nut members partly withdrawn.

Figure 6 is a sectional view of Figure 5.

Figure 7 is a transverse sectional view through the nut.

Figure 8 is a view of one of the nut members.

In these views 1 indicates the bolt, 2 the work-piece and 3 the body of the nut. This nut has its body provided with the tapered opening 4 for receiving the tapered stems of the nut members 5. Each nut member is provided with semi-circular recesses upon its inner face, these grooves forming, when the nut members are in closed position, the bore of the nut, each nut member being threaded, as at 6, to engage the threads of the bolt. The tapered portions with the body and nut members are so arranged that when the nut members are positioned in the body they will be held in closed position so that their grooves will form a bolt receiving opening. The stem of each nut member is preferably provided with 3 flat faces, as shown and the opening in the body is provided with similar faces to receive these faces on the nut members. The body is also provided with longitudinally extending tapered parts 7 for engaging tapered grooves 8 in the nut members, these parts being so formed that when the nut members are moved outwardly they will be spread apart, thus causing them to move away from the bolt. The entire removal of the nut members from the body is prevented by the screws 9 in the body engaging the grooves 10 in the nut members. The nut members are locked in position in the body by means of the locking levers 11 which are pivoted on the end of the body and which are provided with right angular extensions 12 which carry the dogs 13 which pass through holes in the body and engage notches 14 in the nut members. A spring 15 tends to hold the levers in a position with the dogs engaging the notches.

It will thus be seen that by pressing upon the levers to move their dogs out of engagement with the nut members, said nut members can be moved outwardly so that they will separate and thus disengage the bolt. This will permit the nut to be slid upon the bolt. As soon as the nut has struck the workpiece the nut members will slide into normal position and then by rotating the nut in the ordinary manner it may be tightened against the workpiece. The nut may be removed by unscrewing it until the nut members leave the workpiece and then by moving the levers to release their dogs from the nut members, said nut members can be moved outwardly and then the nut can be slid off the bolt without rotating it.

Pins 16 are carried by one nut member and engage holes 17 in the other nut member for connecting the nut members together and thus causing them to move in unison.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A nut of the class described comprising a body, a pair of nut members movably mounted therein, each nut member having a threaded semi-circular recess in its inner face, means for causing the nut members to separate when they are moved outwardly from the body, means for locking the nut members within the body, such locking means comprising a pair of pivoted levers, a dog carried by each lever and each nut member having a notch therein for receiving the dog.

2. A nut of the class described comprising a body having a tapered opening therein, a pair of nut members having tapered stems for engaging said opening, a tapered projection in the body and the nut members having tapered grooves therein for receiving the projection for causing the nut members to move apart when they are drawn outwardly and means for locking the nut members in closed position.

3. A nut of the class described comprising a body having a tapered opening therein, a pair of nut members having tapered stems for engaging said opening, a tapered projection in the body and the nut members having tapered grooves therein for receiving the projection for causing the nut members to move apart when they are drawn outwardly, means for locking the nut members in closed position and means for limiting the outward movement of the nut members.

4. A nut of the class described comprising a body having a tapered opening therein, a pair of nut members having tapered stems for engaging said opening, a tapered projection in the body and the nut members having tapered grooves therein for receiving the projection for causing the nut members to move apart when they are drawn outwardly, means for locking the nut members in closed position, means for limiting the outward movement of the nut members and means for movably connecting the nut members together.

In testimony whereof I affix my signature.

ANI VOLMAN.